United States Patent
Patches et al.

(10) Patent No.: US 10,378,844 B2
(45) Date of Patent: Aug. 13, 2019

(54) WEAPON SAFETY AND MONITORING SYSTEM

(71) Applicant: PASIV DUTY LLC, Georgetown, KY (US)

(72) Inventors: Jeremy Patches, Georgetown, KY (US); Charles Blake Caudill, Vineland, KY (US)

(73) Assignee: PASIV DUTY LLC, Georgetown, KY (US)

( * ) Notice: Subject to any disclaimer, the term of this patent is extended or adjusted under 35 U.S.C. 154(b) by 0 days.

(21) Appl. No.: 15/728,103

(22) Filed: Oct. 9, 2017

(65) Prior Publication Data

US 2018/0100713 A1    Apr. 12, 2018

Related U.S. Application Data

(60) Provisional application No. 62/406,550, filed on Oct. 11, 2016, provisional application No. 62/427,859, (Continued)

(51) Int. Cl.
| | |
|---|---|
| *F41A 17/06* | (2006.01) |
| *G08B 25/01* | (2006.01) |
| *G08B 25/00* | (2006.01) |
| *H04W 88/06* | (2009.01) |
| *F41C 27/00* | (2006.01) |

(Continued)

(52) U.S. Cl.
CPC ............ *F41A 17/063* (2013.01); *F41C 27/00* (2013.01); *F41C 33/029* (2013.01);
(Continued)

(58) Field of Classification Search
CPC ...... F41A 17/063; F41C 27/00; F41C 33/029; G08B 13/1427; G08B 25/004;
(Continued)

(56) References Cited

U.S. PATENT DOCUMENTS

| | | | |
|---|---|---|---|
| 6,412,207 B1* | 7/2002 | Crye | F41A 17/02 42/70.01 |
| 8,890,745 B2 | 11/2014 | Wahlquist et al. | |

(Continued)

FOREIGN PATENT DOCUMENTS

CN    105892312 A    8/2016

OTHER PUBLICATIONS

English machine translation of CN105892312A.
(Continued)

*Primary Examiner* — John Cooper
(74) *Attorney, Agent, or Firm* — King & Schickli, PLLC

(57) ABSTRACT

A safety communication system may include a firearm holder capable of detecting withdrawal of the firearm from a holster. The firearm holder may also be able to communicate via both cellular and low energy communication protocols, but may be adapted to selectively communicate via the low energy communication protocol in the absence of a critical event. When a critical event is detected, both cellular and low energy communication protocol may be used to ensure notification of the critical event is received by a central control. One or more relay devices may relay notification of non-critical events from the firearm holder to central control via a low energy communication protocol, and may relay notification of critical events to central control via cellular protocol. Selective use of low energy protocol saves battery life in non-critical situations, while use of cellular protocol is more reliable when communication of critical situations is necessary.

20 Claims, 9 Drawing Sheets

Related U.S. Application Data filed on Nov. 30, 2016, provisional application No. 62/435,890, filed on Dec. 19, 2016, provisional application No. 62/435,900, filed on Dec. 19, 2016, provisional application No. 62/535,431, filed on Jul. 21, 2017.

(51) Int. Cl.
*F41C 33/02* (2006.01)
*G08B 13/14* (2006.01)
*G06Q 50/26* (2012.01)
*G08B 25/10* (2006.01)

(52) U.S. Cl.
CPC ....... *G08B 13/1427* (2013.01); *G08B 25/004* (2013.01); *G08B 25/016* (2013.01); *H04W 88/06* (2013.01); *G06Q 50/265* (2013.01); *G08B 25/003* (2013.01); *G08B 25/10* (2013.01)

(58) Field of Classification Search
CPC .... G08B 25/10; G08B 25/003; G08B 25/016; H04W 88/06; G06Q 50/265
USPC ............................................................ 42/84
See application file for complete search history.

(56) References Cited

U.S. PATENT DOCUMENTS

| | | | |
|---|---|---|---|
| 2010/0079280 A1 | 4/2010 | Lacaze et al. | |
| 2010/0321186 A1* | 12/2010 | Crook | G08B 13/149 340/568.6 |
| 2014/0023096 A1* | 1/2014 | Czompo | H04J 3/025 370/537 |
| 2015/0187204 A1* | 7/2015 | Houde-Walter | G08B 25/009 340/539.11 |
| 2015/0256990 A1* | 9/2015 | Vilrokx | H04W 76/50 455/404.1 |
| 2015/0309316 A1* | 10/2015 | Osterhout | G06F 3/012 345/8 |
| 2016/0221591 A1* | 8/2016 | Kuehbandner | B61L 1/165 |
| 2016/0285492 A1* | 9/2016 | Vembar | H04W 4/70 |
| 2017/0003101 A1 | 1/2017 | Madrid et al. | |
| 2017/0061781 A1 | 3/2017 | Ware et al. | |
| 2017/0074617 A1 | 3/2017 | Stewart et al. | |
| 2017/0122782 A1* | 5/2017 | Wittkop | G01L 27/00 |
| 2017/0154521 A1* | 6/2017 | Zamorano-Larrate | G08B 25/016 |
| 2017/0160041 A1* | 6/2017 | Stewart | F41A 35/00 |
| 2018/0281747 A1* | 10/2018 | Cogill | B60R 25/30 |

OTHER PUBLICATIONS

Hodgkins, K. New Holster Sensor Detects When a Cop's Weapon is Drawn, Turns on Nearby Body Cams, Feb. 28, 2017.

Realtime Awareness for any Firearm, © 2017 Yardarm Technologies, Inc. (found online).

Superprox® Ultrasonic Proximity Sensors, Small Target Sensing; Model SM607 Series information sheet (date unknown).

* cited by examiner

WEAPON SAFETY AND MONITORING SYSTEM

This application claims priority to U.S. Provisional Patent Application No. 62/406,550, filed Oct. 11, 2016, U.S. Provisional Patent Application No. 62/427,859, filed Nov. 30, 2016, U.S. Provisional Patent Application No. 62/435,890 filed Dec. 19, 2016, U.S. Provisional Patent Application No. 62/435,900, filed Dec. 19, 2016, and U.S. Provisional Patent Application No. 62/535,431, filed Jul. 21, 2017, the disclosures of which are incorporated herein by reference in their entireties.

TECHNICAL FIELD

The present invention relates to the field of weapon safety and police officer safety, and more particularly to a system for monitoring and reporting weapon activity.

BACKGROUND OF THE INVENTION

Police officers and other safety personnel often carry non-lethal weapons as well as firearms as part of their jobs. Such jobs often take the officers into potentially dangerous and hostile environments. While use of a non-lethal weapon may be a first priority in a volatile environment, use of a firearm may become necessary as a last resort. Drawing of a firearm normally indicates that a situation has escalated to a dangerous point at which point, knowledge by other officers or a central dispatch service of the drawing of said firearm may be advantageous. Such knowledge may allow other officers to assist the officer who has drawn the firearm, or may allow the central dispatch the ability to send additional officers for assistance. In addition, knowledge of other information about the officer's condition, such as a location and/or a history of movement may assist dispatch and other officers in helping the officer who has drawn the firearm.

Current methods of communicating such information relate to manual notification by the officer who has drawn a weapon to other officers or dispatch. However, in a situation that has escalated to a point that requires the drawing of a firearm, the officer may not have the ability or time to manually make such a notification, as the officer's hands may not be able to leave the firearm, and the officer's attention must be focused on the potentially hostile situation. Accordingly, it is advantageous to have such notifications automatically communicated on behalf of an officer drawing a firearm.

Accordingly, a need is identified for a system for monitoring the drawing, use, and/or discharge of firearms, as well as monitoring various conditions and parameters associated with the users of the firearm.

SUMMARY OF THE INVENTION

In one embodiment, a firearm holder system for use in association with a firearm, a holster, and a relay device is disclosed. The firearm holder system may include at least one first sensor adapted for sensing a withdrawal of the firearm from the holster, said withdrawal of the firearm being a critical event. At least one second sensor may be provided for sensing a location of the firearm holder system, said location being a non-critical event. The firearm holder system may further include a cellular module adapted for emitting cellular data and a low energy communication module adapted for emitting and receiving low energy communication data. A processor may be included, said processor being in communication with the at least one first sensor, the at least one second sensor, the cellular module, and the low energy communication module. The processor may be adapted to emit a critical signal via both the low energy communication module and via the cellular module in response to the critical event.

In one aspect, the processor may be adapted to detect a presence of the relay device upon receipt of low energy communication data from said relay device. Upon detection of the presence of the relay device, the processor may be further adapted to selectively emit a non-critical signal via the low energy communication module, and wherein, upon determination that the relay device is not present, the processor is adapted to emit a non-critical signal via the cellular module in response to the non-critical event.

The firearm holder system may further include a third sensor for sensing a gunshot, wherein the sensing of the gunshot is a critical event. The second sensor may be one of a microphone or a camera.

In one aspect, the processor may be further adapted to self-calibrate for the presence of the firearm in the holster by comparing an average sensor reading from the first sensor, taken over time, to preset acceptable limits for readings from the first sensor.

In another aspect, a firearm holder system for use in association with a firearm and a holster is disclosed. The firearm holder system may comprise at least one first sensor adapted for monitoring one or more critical signals, at least one of said critical signals being a withdrawal of the firearm from the holster, at least one second sensor for monitoring a at least one non-critical signal, a first communication module adapted for emitting wireless communication according to a first wireless communication protocol, a second communication module adapted for emitting and receiving wireless communication according to a second wireless communication protocol different from the first wireless communication protocol, and a processor in communication with the at least one first sensor, the at least one second sensor, the first communication module, and the second communication module, said processor adapted to selectively emit a communication via either the first communication module or the second communication module based at least in part on whether a critical signal is detected or a non-critical signal is detected. The at least one second sensor may be a location sensor. The first wireless communication protocol may be a cellular communication protocol, and the second wireless communication protocol may be a low energy communication protocol adapted for short range communication. For example, the second wireless communication protocol may be a Bluetooth protocol.

In a further embodiment, a safety communication system for use in association with at least one firearm and at least one holster is disclosed. The safety communication system may comprise at least one firearm holder system including at least one first sensor for sensing a critical event, at least one second sensor for sensing a non-critical event, and a processor adapted for emitting a first signal via a cellular communication protocol and via a first low energy communication protocol in response to detection of the critical event, and further adapted for selectively emitting a second signal via either the cellular communication protocol or via the first low energy communication protocol in response to detection of the non-critical event. In one aspect, the first low energy communication protocol may be any of Bluetooth, Zigbee, Z-Wave, Near Field Communication (NFC), infra-red, ANT, RF4CE, or Nike+. The safety communication system may further include a central control adapted for communication with the at least one firearm holder system.

In another aspect, the safety communication system may further comprise at least one relay device, said relay device including a relay processor and a communication module, said communication module adapted for communicating via the cellular communication protocol, the first low energy communication protocol, and a second low energy communication protocol. In one example, the second low energy communication protocol may be WiFi. The relay device may be adapted to receive the first signal from the firearm holder system via the first low energy communication protocol, and to relay the first signal to the central control via the cellular communication protocol. The relay device may be further adapted to determine an availability of a receiver of the second low energy communication protocol, and if said receiver of the second low energy communication protocol is available, the relay device is further adapted to relay the first signal to the central control via the receiver using the second low energy communication protocol. The receiver may include a wireless WiFi router or other device capable of relaying the second low energy communication protocol.

In a further aspect, the second signal may be emitted from the firearm holder system via the first low energy communication protocol, and the relay device may be adapted to receive the second signal from the firearm holder system. The relay device may be further adapted to determine an availability of a receiver of the second low energy communication protocol, and if said receiver of the second low energy communication protocol is available, the relay device may be further adapted to relay the second signal to the central control via the receiver using the second low energy communication protocol. When the receiver is not available, the relay device may be further adapted to relay the second signal to the central control via the cellular protocol.

The relay device may further include a relay sensor adapted to sense a second critical event. For example, the second critical event may include the detection of the firing of a firearm. The relay device may be adapted to send a third signal to the central control in response to the second critical event. The relay device may be further adapted to determine an availability of a receiver of the second low energy communication protocol, and if said receiver of the second low energy communication protocol is available, the relay device may be further adapted to relay the third signal to the central control via the receiver using the second low energy communication protocol.

The relay device may be adapted to emit a relay location signal via the first low energy communication protocol and the firearm holder system may be adapted to receive the relay location signal. The processor of the firearm holder system may be adapted to emit the second signal via the first low energy communication protocol in response to receipt of the relay location signal. Accordingly, the firearm holder system may selectively utilize the first low energy communication protocol for indicating a non-critical event upon detection of the presence of the relay device, but may utilize the cellular communication protocol if no relay device is detected.

DETAILED DESCRIPTION

Figure 1:
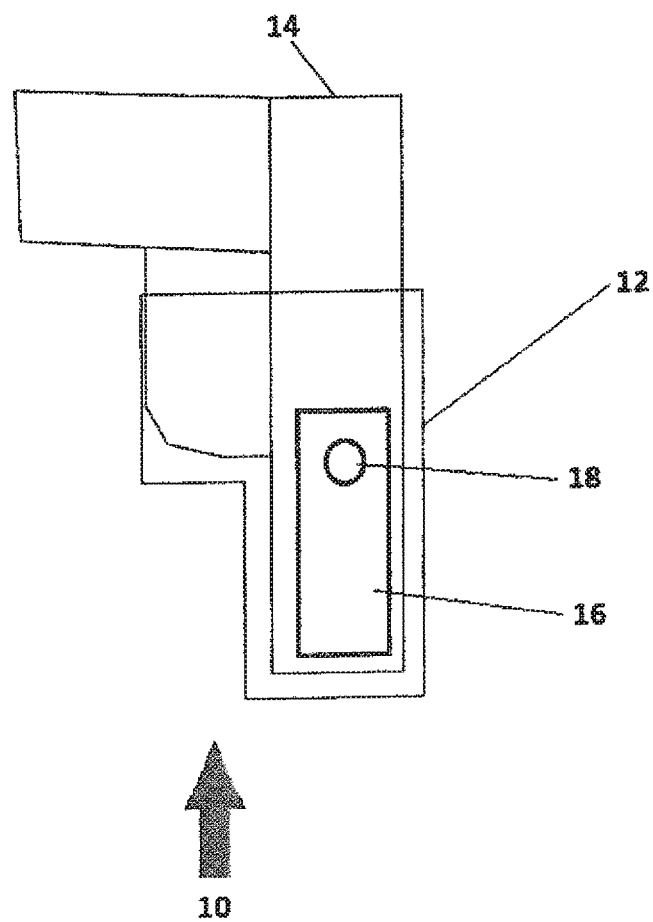
FIG. 1 is a side view of a firearm holder system including a firearm.

As can be seen in FIG. 1, a firearm holder system 10, including a holster 12, may be provided for holding a firearm 14. The holder 10 may include anti-tamper technology, such as being equipped with a device for detecting the presence or absence of a firearm within the holster. In one instance, the holder system 10 may include a processor 16 such as an electronic controller, a microcontroller, computer, or microprocessor, and a sensor 18 for sensing the presence of the firearm 14 within the holster 12. The sensor may be in the form of a non-contact sensor such as an optical sensor, and may convey signals to the processor 16 for determination of the presence or absence of the firearm 14. The sensor may be located at any location relative to the holster 12. In practice, the sensor may measure a distance between the sensor 18 and the firearm 14 within the holster. In the event that measured distance changes, the detection of a change in said distance from the sensor to the processor 16 may be indicative of the firearm 14 being drawn from the holster 12.

Figure 2:
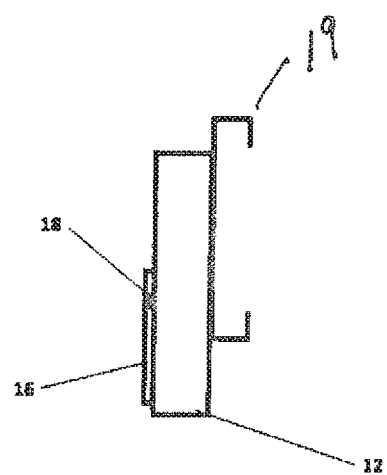
FIG. 2 is a front view of the firearm holder system of FIG. 1.
Figure 3:
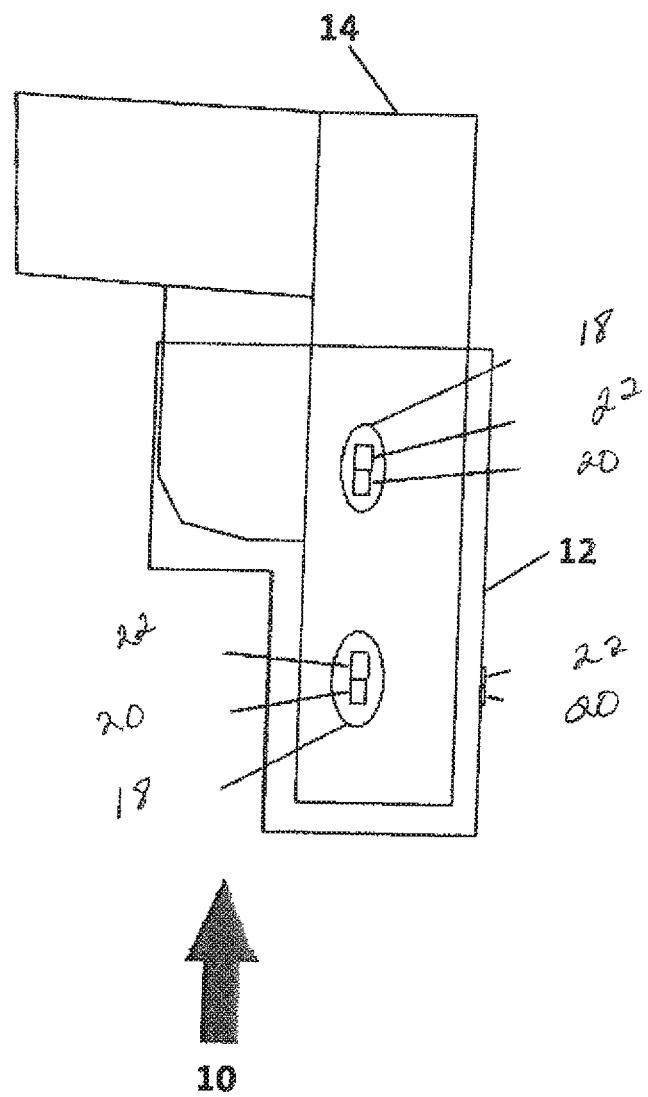
FIG. 3 is another embodiment of a firearm holder system including a firearm.
Figure 4:
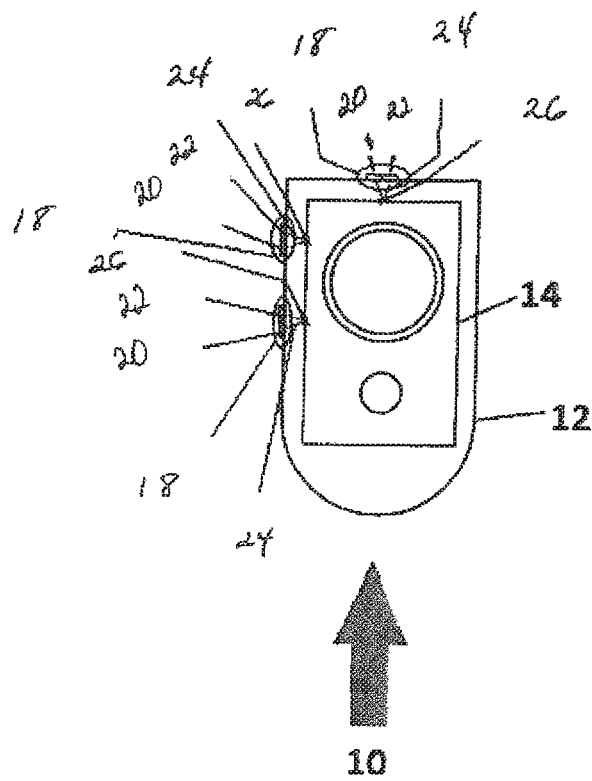
FIG. 4 is a firearm holder system of FIG. 3.

FIG. 2 illustrates an end view one embodiment of the holster 12 of the present invention, in which the processor 16 and the sensor 18 are located on a side of the holster 12 opposite a clip 19 for attachment to a belt or other article of clothing of a wearer. In another embodiment, the processor 16 and/or the sensor 18 may be located on the same side of the holster 12 as the clip 19.

With further reference 3 and 4, a plurality of sensors 18 may be provided for further measurements regarding the presence of the firearm 14 within the holster 12. Each of the sensors 18 may be in communication with the processor 16. The use of multiple sensors may improve accuracy of the determination of firearm presence or absence in the holster and/or the appropriate position of a given firearm within the holster.

In one aspect, the sensor 18 may include a light emitter 20 and a light collector 22, which may be placed adjacent one another. The light emitter 20 may be an LED, a laser, or any other device or bulb adapted to emit light. The light emitter 20 may be adapted to emit a light beam 24 directed toward a reflection point 26 on the firearm within the holster. The light collector such as a photometer a semiconductor based photometer) may be adapted to measure the light reflected off the reflection point 26 and convey a light measurement to the processor.

In another aspect, the sensor 18 may comprise any other non-contact sensor. This may include an inductive sensor, a capacitive sensor, a magnetic sensor, or an ultrasonic sensor.

One or more additional sensors or other measurement devices may be included in the firearm holder system 10 for measuring or recording information about the environment of use of the holder system 10, including advanced location sensors, such as one or more global satellite navigation systems, inertial sensors, gyroscopes, and/or a compass, as well as an antenna, microphones, cameras, accelerometers, temperature sensors, air pressure sensors, humidity sensors, radiation level sensors, volatile organic compound sensors, etc. In addition, one or more information, sound, light, data, or other output device may be included in the holder system 10, such as speakers or other audio output devices, or light such as an LED or warning light.

Figure 5:
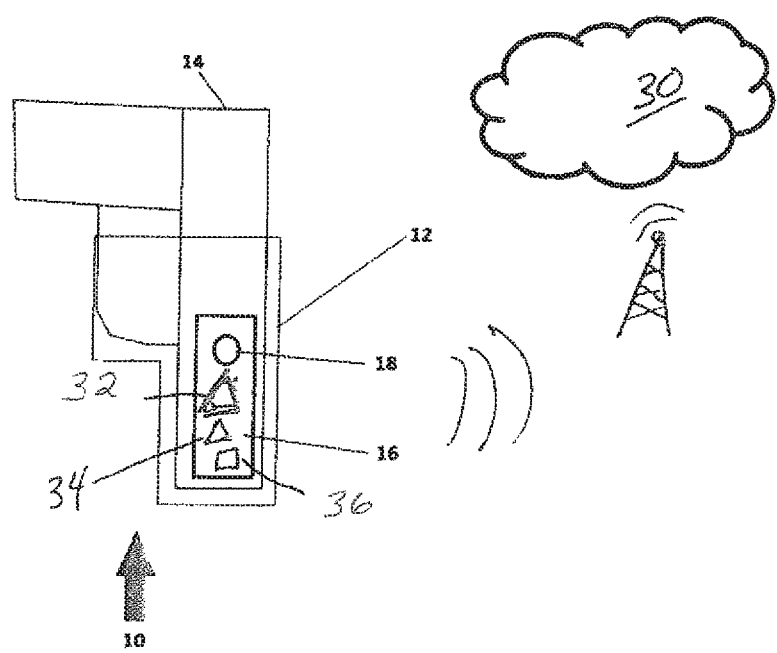
FIG. 5 is a view of a communication module of the firearm holder system.

In one aspect, the firearm holder system 10 may further be adapted to communicate with external devices, including a central control 30, such as for conveying information about, the status of the holder system 10, including whether or not the firearm 14 is present in the holster 12 as expected. The central control 30 may be remote from the holder system 10, and may be adapted to receive and monitor various data and conditions associated with a given firearm holder system 10, or a plurality of different firearm holder systems 10 forming a monitoring network. In one aspect, the central control 30 may comprise a computer, a laptop, tablet, telephone or other mobile device, a server, a central control or dispatch, such as for a police precinct or military base, a third party monitoring system such as a software package, or any other device or entity capable of receiving information from the firearm holder system. With reference to FIG. 5, the holder system 10 may be adapted to communicate with the central control 30 via a cellular module 32. The cellular module 32 may be in a part of the processor 16 or may be in communication therewith. This cellular module may include a cellular radio chip, a SIM card, and an antenna system. In one aspect, the cellular module 32 may be equipped to communicate via a cellular data plan. The cellular data plan may be one that is not tied to any specific cellular carrier, but rather allows for communication between multiple cellular data providers.

In another aspect, the firearm holder system 10 may be adapted for low energy communication, such as via a low energy communication module 34. This low energy communication module 34 may be a part of the processor or may be in communication therewith. For purposes of this disclosure, the term "low energy communication" includes any communication method that requires less than 1 W for transmission. For example, this may include WiFi (~0.2 W) and Bluetooth low energy (~0.2 mW). This is in contrast to cellular communication, which normally consumes approximately 2 W for a transmission. This low energy communication module 34 may be in the form of a chip or microcontroller and may be adapted for communicating over a short range method of communication, such as WiFi, Bluetooth, Zigbee, Z-Wave, Near Field Communication (NFC), infra-red, ANT, RF4CE, Nike+, or other low energy communication protocol. For purposes of this disclosure, the term "short range" method of communication means any communication method with a maximum range of 200 m or less. The low energy communication module 34 may be adapted to communicate with another low energy communication module of a different firearm holder system 10 or other device capable of sending and receiving low energy communication signals within sufficiently close proximity to the firearm holder system 10. In one aspect, the low energy communication protocol may be less reliable than a cellular communication protocol. In another aspect, the low energy communication may have less range than a cellular communication protocol. Importantly, the low energy communication protocol may also consume significantly less energy than use of the cellular communication protocol.

Communication or signals from the firearm holder system 10 may be classified as either critical or non-critical. Examples of critical signals would be notifications of the detection of withdrawal of the firearm from the holster or the detection of a gunshot, and relevant identifying information in conjunction with such conditions, such as the location of said condition and identifying information regarding the firearm drawn and the individual carrying said firearm. This detection of a gunshot may, for example, relate to the detection of a high amplitude signal over a very short time frame in a specific frequency range (e.g. >130 dB in less than 100 ms, centered around 2 kHz). Other examples of critical signals could be notification of a g-force or impact above a predetermined threshold, a temperature that is above or below a predetermined threshold, or radiation levels or volatile gas detection that are outside predetermined thresholds.

Examples of non-critical signals would be sensor signals related to a firearm appropriately located in its holster, as well as location and identification signals of the firearm/wearer when a critical condition has not been detected. The processor 16 may be adapted to preferentially use one communication protocol over another based on the distinction between critical and non-critical signals.

In one example, the firearm holder system 10 may include a power supply 36, such as a battery. Because low energy communication may utilize less power and therefore drain the battery slower, the processor 16 may be adapted to preferentially utilize low energy communication over cellular data when communicating non-critical data (as will be explained below).

Figure 6:
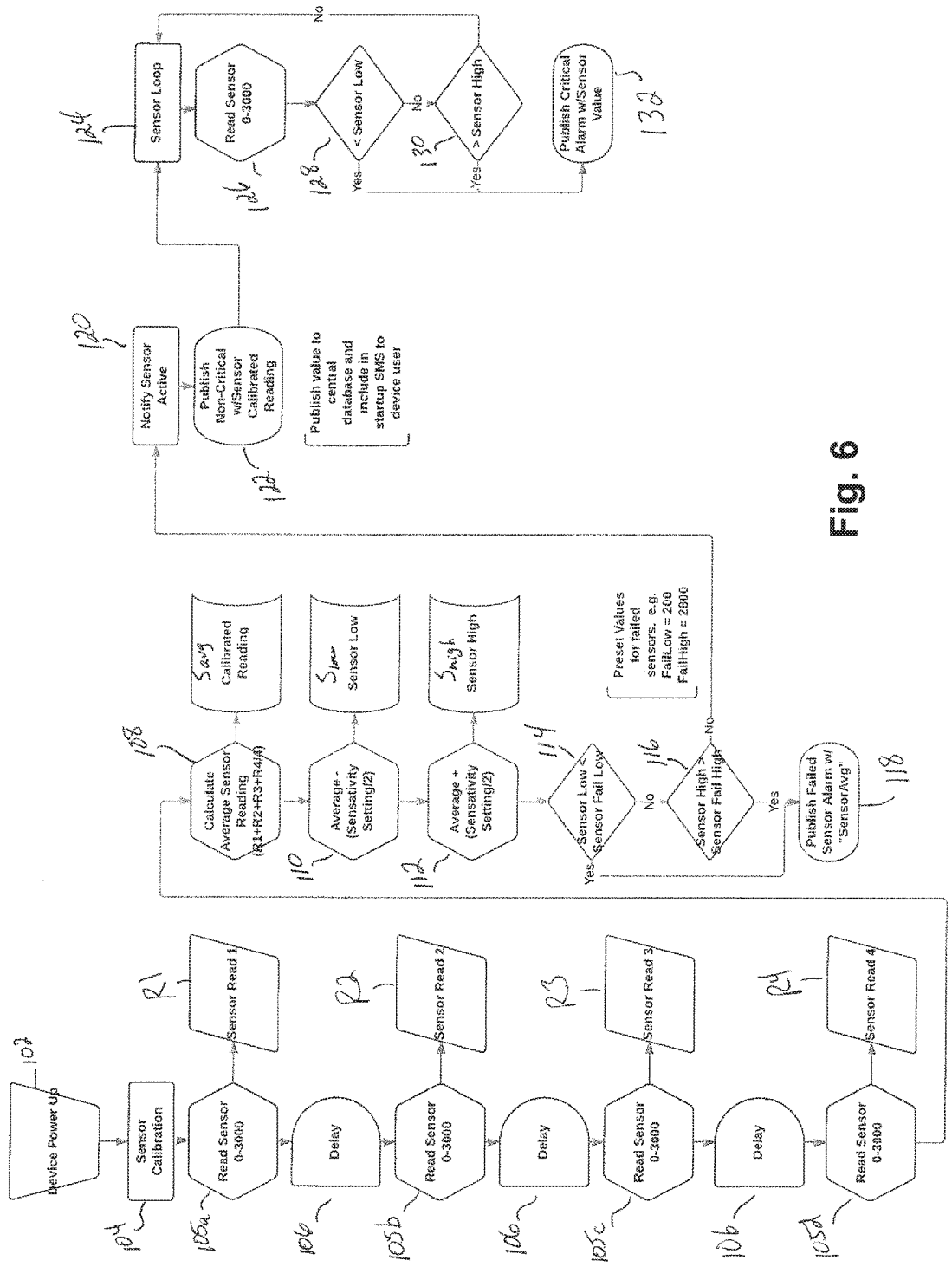
FIG. 6 is a flow chart of a method of self-calibrating and sensing a withdrawal of a firearm from the firearm holder system.

In one aspect, the firearm holder system 10 may be adapted to automatically self-calibrate and be resistant to tampering by a user. As illustrated in FIG. 6, a self-calibration method is disclosed, which calibrates the firearm holder system 10 according to a given firearm 14 such that removal of the firearm from the holster 12, or introduction of an object other than the firearm into the holster may be detected.

In further detail and with further reference to FIG. 6, the firearm holder system 10 may be powered on 102, thereby activating the processor 16 and sensor(s) 18. The system may then enter sensor calibration mode 104. This may involve obtaining plurality of initial sensor readings with the firearm 14 appropriately placed in the holster 12. As illustrated, a first sensor reading R1, a second sensor reading R2, a third sensor reading R3, and a fourth sensor reading R4 are measured at steps 105a, 105b, 105c, and 105d, respectively. At least some delay 106, for example 100 ms, may be allowed between each of these initial sensor readings in order to allow for normal variation to occur. Of course in the case of a firearm holder system 10 including a plurality of sensors 18, these initial sensor readings may be obtained for each of the sensors. For simplicity, the remainder of the calibration procedure is described with respect to the presence of a single sensor.

An average sensor reading $S_{avg}$ of the initial sensor readings is then calculated by the processor at step 108. A low sensor reading $S_{low}$ is calculated by subtracting a first constant $C_1$ from the average sensor reading $S_{avg}$ at step 110. For example, the first constant $C_1$ may be a sensitivity setting SS or half of a sensitivity setting SS/2. Similarly, a high sensor reading $S_{high}$ is calculated by adding a first constant $C_2$ from the average sensor reading $S_{avg}$ at step 112. The second constant $C_2$ may be the same as or different from the first constant $C_1$. The high sensor reading $S_{high}$ and low sensor reading $S_{low}$ may be compared to preset values for high sensor fail level $S_{FailHigh}$ at step 114 and low sensor fail level $S_{FailLow}$ at step 116. These high sensor fail level $S_{FailHigh}$ and low sensor fail level $S_{FailLow}$ may function as boundaries within which may be considered normal sensor functional level. If the high sensor reading $S_{high}$ is greater than the high sensor fail level $S_{FailHigh}$, or if the low sensor reading $S_{low}$ is less than the low sensor fail level $S_{FailLow}$, then the processor 16 may indicate that the sensor 18 is not within normal ranges, as illustrated at step 118. For instance, the processor 16 may publish an alarm indicating a failed sensor. This alarm may, for instance, indicate a "Failed SensorAvg" to the central control 30 and/or may issue an audible alarm indicating the failed sensor average. This calibration and failure notification of a holster system may be accomplished with a single sensor, or a plurality of sensors.

Provided the average sensor reading $S_{avg}$ is within acceptable limits, the processor 16 may notify the central control 30 that the sensor 18 is active at step 120. This may include publishing a calibrated sensor reading as a non-critical signal to the central control 30 at step 122. In addition, the processor 16 may notify the user of the firearm holder system 10 of the calibrated sensor reading, such as via SMS text message, or via a visual display on the firearm holder system 10.

At this point, the holder system 10 may be ready to continuously monitor the presence or movement/withdrawal of the firearm 14 from the holster. This may be accomplished by running a loop 124 of sensor measurements with readings taken at step 126, and then the processor compares them to the low sensor reading $S_{low}$ (step 128) and the high sensor reading $S_{high}$ (step 130) to determine if the sensor reading is within a range which indicates that the firearm is present within the holster. If the sensor reading is between the low sensor reading $S_{low}$ and the high sensor reading $S_{high}$, then the processor determines that the sensor reading is within the acceptable range, and simply awaits another reading from the sensor 18, returning to step 124. In the event that the sensor reading is less than the low sensor reading $S_{low}$, then the processor 16 may determine that the sensor reading is not within the normal range, which may indicate that the firearm has been drawn from the holster. The processor may then publish the sensor reading as a critical signal to the central control 30, as illustrated at step 132. Similarly, the processor 16 may compare the sensor reading to the high sensor reading $S_{high}$, and if the sensor reading is greater than the high sensor reading $S_{high}$, then the processor 16 determine that the firearm has been withdrawn from the holster. The processor may publish this sensor reading as a critical signal to the central control 30 at step 132.

Figure 7:
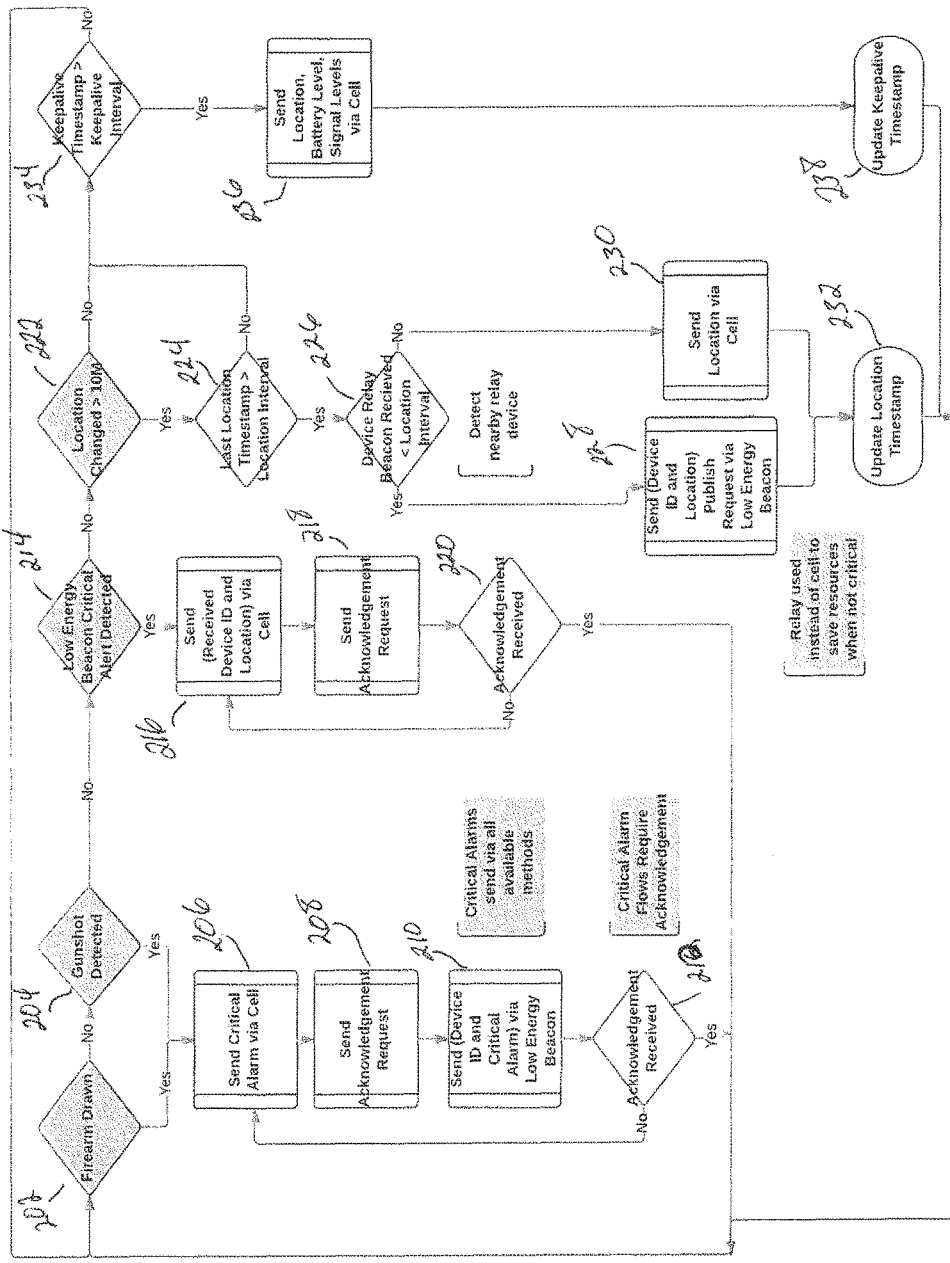
FIG. 7 is a flow chart of a method of receiving and selectively emitting critical and non-critical communicating signals from the firearm holder system.

With further reference to FIG. 7, an outline of the communication protocol is provided for determining which information the processor may communicate and whether said communication is sent via a cellular communication protocol, via one or more low energy communication protocols, or both. Initially, at step 202, the processor may determine if the firearm has been drawn from the holster, such as is described with respect to FIG. 6. The processor may also evaluate whether or not a gunshot has been detected at step 204, such as via a microphone associated with the firearm holder system 10. The system may be adapted to detect a gunshot from the wearer of the firearm holder system 10, or from any firearm within range of the microphone of the firearm holder system 10. Both the detection of the drawing of a firearm and the detection of a gunshot are considered critical signals. Therefore, the detection of one or both of these may cause the processor to send a critical alarm via a cellular protocol to the central control 30 at step 206. This may include communication of the specific type of critical alarm (e.g. "firearm drawn" or "gun shot detected") to the central control 30. Because these are critical signals, the processor additionally may send an acknowledgement request via cellular protocol to the central control 30, as shown at step 208.

As an additional means of communicating a critical signal, the processor may additionally publish a critical low energy beacon via the low energy communication protocol at step 210. This critical low energy beacon may include the critical signal as well as identifying information regarding the device that has determined the critical signal. For instance, the critical low energy beacon may include the identity of the firearm or the identity the wearer of the firearm which originates the critical signal, and/or the location of the firearm holder system 10 communicating the critical signal, along with the critical signal itself.

The critical low energy beacon is sent for detection by any secondary firearm holder systems which may be within communication range of the emitting firearm holder system. In addition, one or more external communication devices, such as a secondary relay device as described below, which may be adapted to receive the low energy beacon from an emitting firearm holder system. In either case, the secondary firearm holder system or the external communication device may be adapted to receive the critical low energy beacon and relay the critical signal to the central control 30.

Provided an acknowledgement is received from the central control 30 at step 212, the processor may restart the loop of detecting whether or not a critical signal triggering event (e.g. the drawing of a firearm or the detection of a gunshot) has occurred, cycling back to step 202. If no acknowledgement is received from central control 30, then the processor may reinitiate the communication of the critical signal via the cellular communication protocol (with acknowledgement request) at step and via emission of the critical low energy beacon at steps 206, 208, and 210. Accordingly, in the instance of a critical signal, the processor may be adapted to repeatedly communicate the critical signal via multiple or all available communication protocols until acknowledgement of receipt of the critical signal by central control is received by the emitting firearm holder system. This provides redundancy to ensure that critical signals are reached by the central control 30.

In further reference to FIG. 7, the processor of the firearm holder system 10 (also referred to as a primary firearm holder system) may additionally be adapted to monitor for receipt itself of a critical low energy beacon from a secondary firearm holder system 10', as indicated at step 214. For instance, the primary firearm holder system 10 may utilize its own low energy communication module to detect any critical low energy beacons received from a nearby secondary firearm holder system 10' emitting its own critical low energy beacon. In the event that the primary firearm holder system 10 detects a critical low energy beacon from a secondary firearm holder system 10', it may relay the critical signal along with identifying information of the secondary firearm holder system 10' to the central control 30 via the cellular communication protocol at step 216. In addition, the relay of this critical signal and identifying information about, the secondary firearm holder system from the primary firearm holder system 10 to the central control 30 may be accompanied by an acknowledgement request (step 218). And until acknowledgement from the central control 30 is received by the primary firearm holder system 10 (i.e. at step 220), the primary firearm holder system 10 may continue to relay the critical signal to central control by reverting back to step 216. Once acknowledgement is received, the primary firearm holder system 10 may resume monitoring for withdrawal of its own firearm, detection of a gunshot, and/or receipt of a critical low energy beacon from a secondary firearm holder system 10'.

In another aspect, the primary firearm holder system 10 may send non-critical data to the central control 30, such as its own location. With continued reference to FIG. 7, this transmission of location information is illustrated. For example, if the firearm holder system 10 determines that its location has changed more than a predetermined distance (e.g. 10 m) since the last location was transmitted (step 222) and if the last "location timestamp" (i.e. time at which the last location was transmitted) is greater than a predetermined location interval (e.g. 30 seconds), as indicated at step 224, then the firearm holder system 10 may detect whether or not a secondary relay device is present (see FIG. 8). This secondary relay device, if available, may be capable of transmitting this non-critical data instead of the firearm holder system having to transmit said data itself. This may be accomplished be determining if the firearm holder system 10 has received a device relay beacon from the secondary relay device within the predetermined location interval (step 226). If so, then the firearm holder system 10 may send a publish request to the secondary relay device via a low energy beacon as indicated at step 228. This publish request may include identifying data related to the firearm holder system 10, as well as its location. In this way, the firearm holder system 10 may rely on the secondary relay device for transmission of this identifying data and location for the firearm holder system.

If no device relay beacon has been received by the firearm holder system 10 from the secondary relay device within the predetermined location interval in step 226, then the firearm holder system 10 may send its location via cellular communication at step 230. In other words, the firearm holder system 10 preferentially sends a publish request via a low energy beacon so that the secondary relay device may relay the identifying data and location information, but can send this data/information itself via cellular communication if it must. In either case, once the location information has been transmitted to central control 30, the firearm holder system 10 updates its location timestamp at step 232.

In another aspect, data regarding various events is collected at various intervals which may be viewed as a "keep alive" or "standard health check" of the holder system. These data, which may be characterized as non-critical data, may be sent regardless of whether any alarm status has been triggered, as an update to the central control 30 regarding the status of the firearm holder system. In one aspect, the firearm holder system 10 may send data related to parameters which, if compromised, may prevent normal operation under alarm conditions. For example, the firearm holder system 10 may emit data related to position of the firearm holder system 10, battery level, signal level, etc. to the central control 30. Communication of this information may be selectively sent via low energy communication if available, or via cellular communication if low energy communication is not available.

With further reference to FIG. 7, this "keep alive" or "standard health check" relay of data is also illustrated. The firearm holder system 10 may be programmed with a "keep alive interval," representative of a time period (e.g. 10 minutes) after which it will update the central control regarding these non-critical data regarding the status of the firearm holder system's operations. If the time since the most recent "keep alive timestamp" is greater than the keep alive interval (step 234), then this non-critical data may be sent to central control such as via cellular communication (or via low energy communication if available) at step 236, and the keep alive timestamp may be reset at step 238. If the keep alive time interval has not yet been exceeded, then the firearm holder system 10 may resume monitoring for critical data and the cycle may resume.

Figure 8:
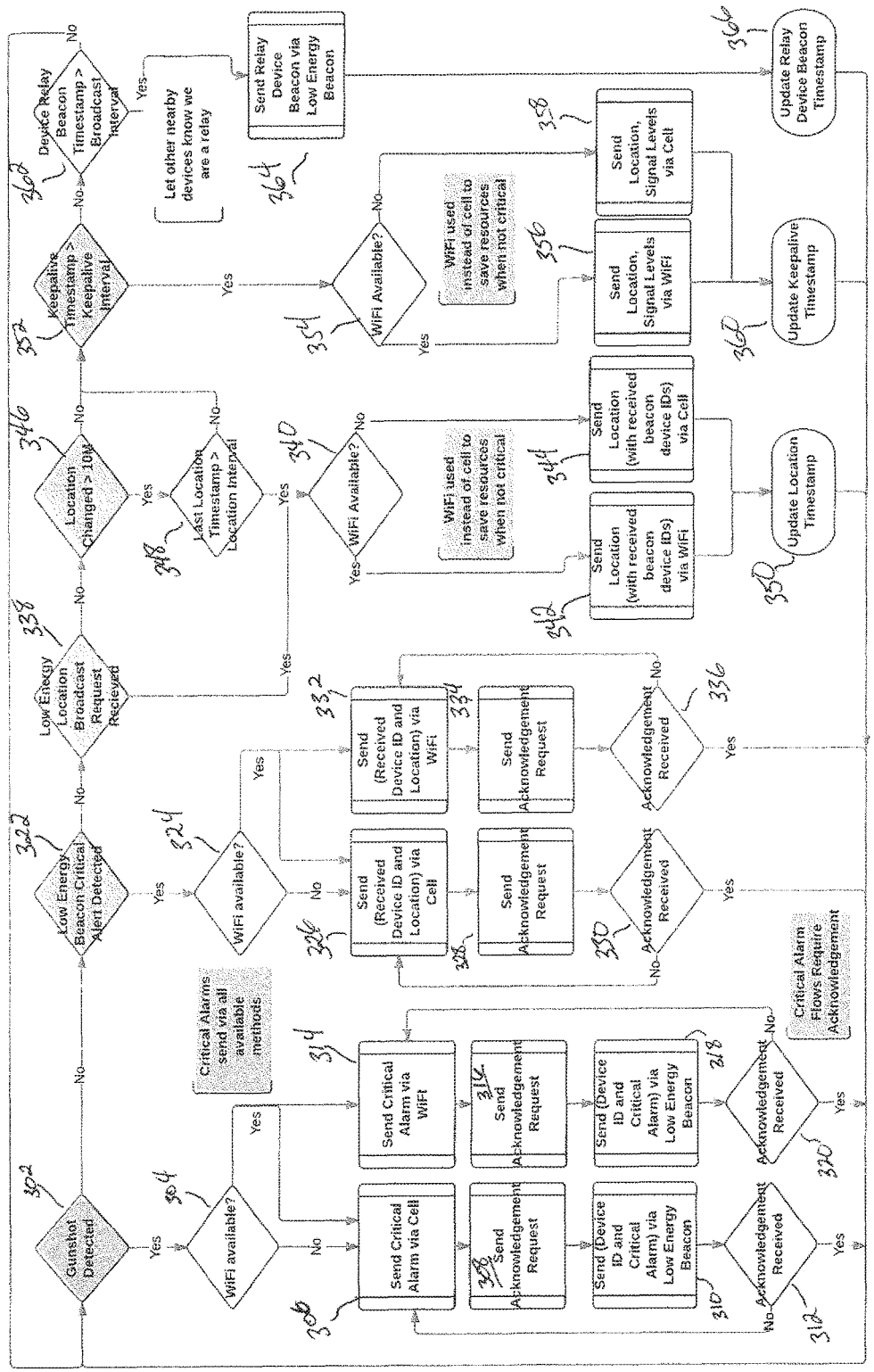
FIG. 8 is a flow chart of a method of receiving and selectively emitting critical and non-critical communicating signals from a secondary relay device.

With reference to FIG. 8, the function of the secondary relay device is illustrated in further detail. The secondary relay device may be a computer, laptop, tablet, telephone or other mobile device, vehicle equipped for low energy communication, or a separate device, such as may be added to a vehicle, for communication within the overall network. The secondary relay device may include a communication module with cellular radio, WiFi radio, Bluetooth radio. The secondary relay device may be equipped with a sensor package with a gunshot detection microphone and related circuits. In one aspect, it may include advanced location sensors, such as one or more global satellite navigation systems, inertial sensors, gyroscopes, and/or a compass, as well as an antenna. In a further aspect, the secondary relay device may be mounted to a vehicle (e.g. rigidly mounted to the vehicle to prevent movement relative to the vehicle). In another aspect, the secondary relay device may be powered by the vehicle electrical system. A battery may be provided for powering the secondary relay system, such as an internal rechargeable battery.

The secondary relay device may be provided for detecting information relevant to a critical signal (e.g. a gunshot or a critical low energy beacon from a firearm holder system), as well as for relaying non-critical information from firearm holder systems. This secondary relay device may be separate and/or remote from a firearm holder system or other firearm holster. The secondary relay device may include a relay processor and may be in the form of a computer, a computer server, a telephone, tablet, or other mobile device, or a microprocessor which may be connected to the communication module of the secondary relay device.

Similar to the firearm holder system, the secondary relay device may include a cellular module adapted for cellular communication and a low energy communication module adapted for low energy communication over short ranges (i.e. as part of the communication module). The low energy communication module may be in the form of a chip or microcontroller and may be adapted for communicating over a short range method of communication, such as WiFi, Bluetooth, Zigbee, Z-Wave, Near Field Communication (NFC), infra-red, ANT, RF4CE, Nike+, or other low energy communication protocol. The low energy communication module may be adapted to communication with another low energy communication module, such as one from a nearby firearm holder system 10 or other device capable of sending and receiving low energy communication signals within sufficiently close proximity to the secondary relay device. In one aspect, the low energy communication protocol may be less reliable than a cellular communication protocol. In another aspect, the low energy communication may have less range than a cellular communication protocol. Importantly, the low energy communication protocol may also consume significantly less energy than use of the cellular communication protocol.

In another aspect, the secondary relay device may include one or more sensors for sensing an environmental condition. For example, the secondary relay device may include a microphone or camera for recording audio and/or visual data. Alternatively, the sensors may be separate from the secondary relay device, but in communication therewith and adapted to send signals to said secondary relay device.

The secondary relay device may be adapted for sensing critical conditions itself and transmitting critical signals to the central control 30. In another aspect, the secondary relay device may be adapted for relaying critical signals received from one or more firearm holder systems to the central control 30.

FIG. 8 illustrates one manner that the secondary relay device may utilize in monitoring and relaying information to central control. If the secondary relay device itself detects a gunshot at step 302 (e.g. from data received from a microphone or video camera associated with the secondary relay device), which would be considered a critical condition, then the relay processor may determine if a WiFi receiver is available at step 304. This may involve a determination if the WiFi signal from the WiFi receiver corresponds to a trusted set of WiFi signals, which may be preprogrammed in the relay processor. For example, the secondary relay device and/or a firearm holder system 10) may be programmed with a network identifier (e.g. a SSID) of one or more trusted WiFi networks. The secondary relay device (and/or firearm holder system 10), may periodically send data across the connection of such trusted WiFi networks in order to confirm a response, thereby confirming that the trusted WiFi connection is usable.

If no WiFi is available, then the secondary relay device may send a critical signal to central control via a cellular communication protocol at step 306. This may include an acknowledgement receipt as indicated at step 308. The secondary relay device may additionally send a critical low energy beacon at step 310 including identifying information about itself (e.g. a device ID, location, etc.) via a low energy communication protocol. If no acknowledgement is received (i.e. 312), then the secondary relay device may reinitiate this loop of sending the critical signal via cellular communication protocol at step 306, including an acknowledgement request, and a critical low energy beacon until an acknowledgement is received.

In the event that WiFi is determined to be available at step 304, the secondary relay device may send the critical signal out via both WiFi at step 314 and cellular communication protocol at step 306, both of which including an acknowledgement request steps 308 and 316). Similarly, the critical low energy beacon including identifying information about the secondary relay device may also sent via low energy communication protocol at step 318. As in the case of no WiFi, the secondary relay may continue to send the critical signal (via WiFi and cellular) as well as the critical low energy beacon until acknowledgement is received. In each case, critical signals require acknowledgement before the secondary relay device will cease sending said critical signals.

The secondary relay device may additionally or alternately monitor for critical low energy beacons received from one or more emitting firearm holder systems (or a nearby additional secondary relay device) at step 322, said critical low energy beacons including identifying information about the device emitting the critical beacon (i.e. "the emitting device"). If a critical low energy beacon is received by the secondary relay device, then the relay processor may determine if WiFi is available at step 324. If no WiFi is available, then the secondary relay device may relay the critical signal, including the identifying information about the emitting device, to central control via cellular communication protocol at step 326, along with an acknowledgement request at step 328. As with all critical signals, the secondary relay device will continue relaying this critical signal and identifying information about the emitting device until acknowledgement is received at step 330.

In the event that WiFi is determined to be available, the secondary relay device may relay the critical signal, including the identifying information about the emitting device, via both WiFi at step 332 and cellular communication protocols at step 326, both of which including an acknowledgement request as indicated in steps 334 and 328, respectively. As in the case of no WiFi, the secondary relay may continue to relay the critical signal (via WiFi and cellular) until acknowledgement is received (at steps 336 and 330, respectively).

In addition, the secondary relay device may monitor whether or not any nearby firearm holder systems 10 (or nearby additional secondary relay devices) have emitted a low energy beacon requesting location publication at step 338 and as referenced in FIG. 7. If a low energy broadcast request has been received by the secondary relay device, said secondary relay device may determine if a trusted. WiFi network is available at step 340. If so, then the received location (and relevant identifying information from the emitting firearm holder system) may be transferred to central control 30 via WiFi at step 342. If no trusted WiFi is available, then the secondary relay device may send the received location (and relevant identifying information from the emitting firearm holder system) to central control 30 via cellular communication at step 344. In the case of this non-critical information, WiFi communication is preferentially used over cellular communication, as WiFi requires less power.

The secondary relay system may additionally send information to central control 30 regarding its own location. Much like in the case of the firearm holder system described with regard to FIG. 7, the secondary relay system may determine if its own location has changed more than a predetermined distance (e.g. 10 m) since the last time its location was transmitted at step 346 and if the last "location timestamp" (i.e. time at which its last location was transmitted) is greater than a predetermined location interval (e.g. 30 seconds) at step 348. If so, then the secondary relay may again make the determination whether trusted WiFi is available as indicated in step 340. If so, the secondary relay device may preferentially communicate its own location via WiFi to central control 30, but if WiFi is not available, then said location may be transmitted via cellular communication protocol in steps 342 and 344, respectively. In either case, the secondary relay device's location timestamp may be updated after the transmittal of the location as indicated at step 350.

And as with the firearm holder system, the secondary relay device may be adapted to transmit its own "keep alive" or "standard health check" data to the central control. Similarly, these data, which may be characterized as non-critical data, may be sent regardless of whether any alarm status has been triggered, as an update to the central control 30 regarding the status of the secondary relay device and the overall system. In one aspect, the secondary relay device may send data related to parameters which, if compromised, may prevent normal operation under alarm conditions. For example, the secondary relay device may emit data related to position of the secondary relay device, signal level, battery level (if battery powered) etc. to the central control 30. Communication of this non-critical information may be selectively sent via low energy communication if available (i.e. if a trusted WiFi network is available), or via cellular communication if low energy communication is not available.

With further reference to FIG. 8, this "keep alive" or "standard health check" relay of data is also illustrated. The secondary relay device may be programmed with a "keep alive interval," representative of a time period (e.g. 10 minutes) after which it will update the central control regarding these non-critical data regarding the status of the secondary relay device's operations. If the time since the most recent "keep alive timestamp" is greater than the keep alive interval, as determined at step 352, then the secondary relay device may determine if a trusted WiFi network is available at step 354. If WiFi is available, then this non-critical information will be transmitted to central control 30 via WiFi as indicated in step 356. If WiFi is not available, then said information may be transmitted to central control 30 via cellular protocol at step 358. In either case, the keep alive timestamp may be updated upon transmittal of this non-critical information at step 360.

The secondary relay device may further be adapted to periodically emit a low energy relay device beacon at regular broadcast intervals in order to notify nearby firearm holder systems (or other secondary relay devices) that the secondary relay device is present and available for relaying signal. The broadcast interval may be a predetermined time period (e.g. 1 minute). As further illustrated in FIG. 8, this may be accomplished by comparing a "relay device beacon timestamp" (i.e. a time since the last relay device beacon was sent) to the broadcast interval at step 362. If it has been longer than the broadcast interval since the last relay device beacon was sent, then the secondary relay device may emit the relay device beacon via a low energy beacon at step 364, and the relay device beacon timestamp may be updated at step 366. If the broadcast interval has not yet been exceeded, then the secondary relay device may resume monitoring for critical data and the cycle may resume, such as beginning again at step 302.

In a further aspect of the invention, a network of devices may be adapted for communicating with one another, including a central control 30, one or more firearm holder systems 10, and/or one or more secondary relay devices. These may be in the form of a server or other computer device serving as central control, such as may be found at a police precinct, one or more firearm holder systems worn by police officers associated with the precinct, and one or more laptops, tablets, or other mobile devices associated with a police vehicle. In practice, if a firearm holder system worn by a police officer detects a critical event (e.g. drawing of the firearm, detection of a gunshot, or other potential life/safety threatening situation for the officer as indicated above), it may continuously send a critical signal to the precinct via cellular and may also send a critical low energy beacon, until a requested acknowledgement is received. Similarly, if the firearm holder system detects a critical low energy beacon from the firearm holder system of another officer, it may send that information received in that critical low energy beacon to the precinct via cellular.

Similarly, if the secondary relay device, such as a laptop or other mobile device associated with the police vehicle, detects a critical event, it may continuously send a critical signal to the precinct via both cellular (and WiFi if available), as well as a critical low energy beacon, until a requested acknowledgement is received. In addition, the secondary relay device may also monitor for low energy beacons from firearm holder systems worn by officers or other secondary relay devices in the vicinity. If a critical low energy beacon is received by the secondary relay device from a nearby officer or from a nearby secondary relay device, then the receiving secondary relay device may relay that critical information to the precinct via cellular (and WiFi if available).

In addition, the firearm holder systems worn by the police officers and/or the secondary relay device (such as may be associated with the police vehicle) may monitor and/or communicate non-critical data as well (e.g. periodic location, confirmation that device is still active, notification of presence to nearby devices, battery or signal levels, or any other signal that may indicate normal operation may be compromised under an alarm condition). Upon a determination that the data is not considered critical, the firearm holder system or the secondary relay device may preferentially communicate the information to nearby devices and/or the precinct via a low energy communication protocol instead of via a cellular protocol, which may conserve energy expenditure.

Figure 9:
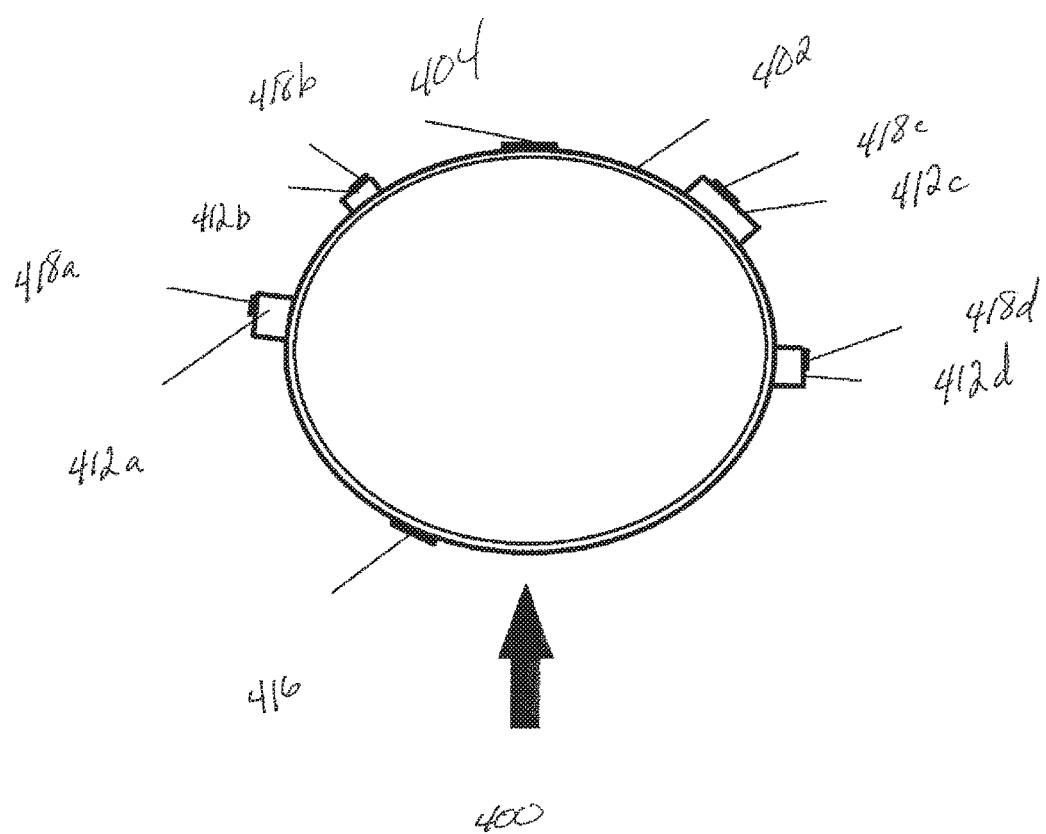
FIG. 9 is a top view of a connected belt.

In a further aspect, a connected belt 400 may be provided to a user, as illustrated in FIG. 9, for holding various items that the user (such as an officer) may carry while working. The connected belt 400 may include a strap 402, which may be adapted for wrapping around a waist or abdomen of the user. The strap 402 may be connected by a connector 404, such as a buckle or clasp. In addition, one or more holders 412*a*, 412*b*, 412*c*, 412*d* may be provided for holding various tools or weapons. The holders may be in the form of holsters, pouches, cases, baskets, clasps, or clamps. These holders may be adapted to carry tools or weapons such as handcuffs, a flashlight, non-deadly weapons such as a club, an electroshock weapon, or a self-defense spray (e.g. mace, pepper spray or teargas), or a deadly weapon such as a firearm.

One or more sensors 418*a*, 418*b*, 418*c*, 418*d* may be provided for sensing a presence of the tool or weapon within the respective holder. The type and operation of sensors associated with holders on the belt is similar to the type and operation of any of the sensors 18 associated with the holster 12 as described above. In each case, the sensors 418*a*, 418*b*, 418*c*, 418*d* may be adapted to monitor the presence and withdrawal of the tool or weapon from the respective holders 412*a*, 412*b*, 412*c*, 412*d* holding said tool or weapon.

The connected belt 400 may further include a processor 416. This processor 416 may be an electronic controller, a microcontroller, a computer, or a microprocessor. The one or more sensors 418*a*, 418*b*, 418*c*, 418*d* may be in communication with the processor 416, such as via wired or wireless communication. The sensors may convey signals to the processor 416 for determination of the presence or absence of the tool or weapon within the respective holders 412*a*, 412*b*, 412*c*, 412*d*.

The connected belt 400 may be in communication with the central control 30 and/or other connected belts 400 or other firearm holder systems 10. This communication may be through the use of a cellular module and a low energy communication module as described above. The cellular module and the low energy communication module may be a part of the processor 416 of the connected belt 400, or may be in wired or wireless communication therewith. Accordingly, the processor 416 of the connected belt 400 may be adapted to communication with the central control and other connected belts or firearm holder systems in a similar manner as described above and illustrated in FIGS. 6-8.

In one aspect, processor 416 may be adapted to distinguish between the type of item held within the respective holders 412*a*, 412*b*, 412*c*, 412*d*, such as distinguishing between tools, non-deadly weapons, and deadly weapons. For example, a given holder may be adapted to carry only a given type of item, such as a firearm holster being adapted to carry a firearm, or a flashlight pouch being adapted to carry a flashlight. The sensors associated with the given holders and the processor 416 may be adapted to self-calibrate determine the presence and withdrawal of the tool or weapon within the given holders as illustrated in FIG. 6 and as described above. In the case of a connected belt with a plurality of holders, the processor 416 may be adapted to classify the withdrawal of a tool or weapon as either critical (e.g. withdrawal of a firearm) or non-critical (e.g. withdrawal of a non-deadly weapon or a tool). The method of communication of said withdrawal by the processor 416 may be determined by whether the withdrawal is considered critical or non-critical. For instance, communication by the processor 416 of a non-critical withdrawal (e.g. withdrawal of a self-defense spray or withdrawal of handcuffs) may be communicated via the low energy communication module, while communication by the processor 416 of a critical withdrawal (e.g. withdrawal of a firearm) may be communicated via both the low energy communication module and also via the cellular module.

The foregoing descriptions of various embodiments provide illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. A firearm holder system for use in association with a firearm, a holster, and a relay device, said firearm holder system comprising:
   at least one first sensor adapted for sensing a withdrawal of the firearm from the holster, said withdrawal of the firearm being a critical event;
   at least one second sensor for sensing a location of the firearm holder system, said location being a non-critical event;
   a cellular module adapted for emitting cellular data;
   a low energy communication module adapted for emitting and receiving low energy communication data; and
   a processor in communication with the at least one first sensor, the at least one second sensor, the cellular module, and the low energy communication module;
   wherein the processor is adapted to emit a critical signal via both the low energy communication module and via the cellular module in response to the critical event.

2. The firearm holder system of claim 1, wherein the processor is adapted to detect a presence of the relay device upon receipt of low energy communication data from said relay device.

3. The firearm holder system of claim 2, wherein, upon detection of the presence of the relay device, the processor is further adapted to selectively emit a non-critical signal via the low energy communication module, and wherein, upon determination that the relay device is not present, the processor is adapted to emit a non-critical signal via the cellular module in response to the non-critical event.

4. The system of claim 1, further including a third sensor for sensing a gunshot, wherein the sensing of the gunshot is a critical event.

5. The system of claim 4, wherein the second third sensor is one of a microphone or a camera.

6. The system of claim 1, wherein the processor is further adapted to self-calibrate for the presence of the firearm in the holster by comparing an average sensor reading from the first sensor, taken over time, to preset acceptable limits for readings from the first sensor.

7. A firearm holder system for use in association with a firearm, a holster, said firearm holder system comprising:
   at least one first sensor adapted for monitoring one or more critical signals, at least one of said critical signals being a withdrawal of the firearm from the holster;
   at least one second sensor for monitoring a at least one non-critical signal;
   a first communication module adapted for emitting wireless communication according to a first wireless communication protocol;
   a second communication module adapted for emitting and receiving wireless communication according to a second wireless communication protocol different from the first wireless communication protocol; and
   a processor in communication with the at least one first sensor, the at least one second sensor, the first communication module, and the second communication module, said processor adapted to selectively emit a communication via either the first communication module or the second communication module based at least in part on whether a critical signal is detected or a non-critical signal is detected.

8. The firearm holder system of claim 7, wherein the at least one second sensor comprises a location sensor.

9. The firearm holder system of claim 7, wherein the first wireless communication protocol is a cellular communication protocol, and the second wireless communication protocol is a low energy communication protocol adapted for short range communication.

10. A safety communication system for use in association with at least one firearm and at least one holster, said safety communication system comprising:
    at least one firearm holder system including
       at least one first sensor for sensing a critical event;
       at least one second sensor for sensing a non-critical event; and
       a processor adapted for
          emitting a first signal via a cellular communication protocol and via a first low energy communication protocol in response to detection of the critical event, and
          further adapted for selectively emitting a second signal via either the cellular communication protocol or via the first low energy communication protocol in response to detection of the non-critical event; and
    a central control adapted for communication with the at least one firearm holder system.

11. The safety communication system of claim 10, further comprising at least one relay device, said relay device including a relay processor and a communication module, said communication module adapted for communicating via the cellular communication protocol, the first low energy communication protocol, and a second low energy communication protocol.

12. The safety communication system of claim 11, wherein the relay device is adapted to receive the first signal from the firearm holder system via the first low energy communication protocol, and to relay the first signal to the central control via the cellular communication protocol.

13. The safety communication system of claim 12, wherein the relay device is further adapted to determine an availability of a receiver of the second low energy communication protocol, and if said receiver of the second low energy communication protocol is available, the relay device is further adapted to relay the first signal to the central control via the receiver using the second low energy communication protocol.

14. The safety communication system of claim 11, wherein the second signal is emitted from the firearm holder system via the first low energy communication protocol, and wherein the relay device is adapted to receive the second signal from the firearm holder system, and wherein the relay device is further adapted to determine an availability of a receiver of the second low energy communication protocol, and if said receiver of the second low energy communication protocol is available, the relay device is further adapted to relay the second signal to the central control via the receiver using the second low energy communication protocol.

15. The safety communication system of claim 14, wherein when the receiver is not available, the relay device is further adapted to relay the second signal to the central control via the cellular protocol.

16. The safety communication system of claim 11, wherein the relay device further includes a relay sensor adapted to sense a second critical event.

17. The safety communication system of claim 16, wherein the relay device is adapted to send a third signal to the central control in response to the second critical event.

18. The safety communication system of claim 17, wherein the relay device is further adapted to determine an availability of a receiver of the second low energy communication protocol, and if said receiver of the second low energy communication protocol is available, the relay device is further adapted to relay the third signal to the central control via the receiver using the second low energy communication protocol.

19. The safety communication system of claim 11, wherein the relay device is further adapted to emit a relay location signal via the first low energy communication protocol and the firearm holder system is adapted to receive the relay location signal.

20. The safety communication system of claim 19, wherein the processor of the firearm holder system is adapted to emit the second signal via the first low energy communication protocol in response to receipt of the relay location signal.

\* \* \* \* \*

UNITED STATES PATENT AND TRADEMARK OFFICE
CERTIFICATE OF CORRECTION

PATENT NO. : 10,378,844 B2
APPLICATION NO. : 15/728103
DATED : August 13, 2019
INVENTOR(S) : Jeremy Patches and Charles Blake Caudill Page 1 of 1

It is certified that error appears in the above-identified patent and that said Letters Patent is hereby corrected as shown below:

In the Specification

Column 16, Line 1, please delete the word "second".

Signed and Sealed this
Twenty-fourth Day of September, 2019

Andrei Iancu
*Director of the United States Patent and Trademark Office*